(12) United States Patent
Lin

(10) Patent No.: US 6,868,548 B2
(45) Date of Patent: Mar. 15, 2005

(54) OPTICAL STORAGE CARRIER PLAYER COVER-LOCKING MECHANISM AND METHOD FOR CONTROLLING THE COVER-LOCKING MECHANISM

(75) Inventor: Chi-Cheng Lin, TaoYuan (TW)

(73) Assignee: Benq Corporation, TaoYuan (TW)

( * ) Notice: Subject to any disclaimer, the term of this patent is extended or adjusted under 35 U.S.C. 154(b) by 435 days.

(21) Appl. No.: 09/929,009

(22) Filed: Aug. 15, 2001

(65) Prior Publication Data

US 2002/0131355 A1 Sep. 19, 2002

(30) Foreign Application Priority Data

Mar. 16, 2001 (TW) ........................................ 90106139 A

(51) Int. Cl.⁷ .............................................. G11B 33/02
(52) U.S. Cl. ........................................................ 720/657
(58) Field of Search ........................ 720/657; 369/75.1, 369/79; 360/69, 77.2, 99.6

(56) References Cited

U.S. PATENT DOCUMENTS

| | | | |
|---|---|---|---|
| 3,593,327 A | * | 7/1971 | Shill .......................... 360/99.6 |
| 3,684,295 A | * | 8/1972 | Strain et al. .................. 360/93 |
| 3,938,185 A | * | 2/1976 | Ito .............................. 360/69 |
| 4,439,850 A | * | 3/1984 | Takahara et al. ........... 369/77.2 |
| 5,267,105 A | * | 11/1993 | Morikawa et al. ......... 360/99.6 |

* cited by examiner

Primary Examiner—Tianjie Chen
(74) Attorney, Agent, or Firm—Troxell Law Office, PLLC

(57) ABSTRACT

This invention relates to a optical storage carrier player cover-locking mechanism and method, which provides a optical storage carrier player cover that can actuate a locked state to prevent a optical storage carrier from rotating as cover is being lifted up and a lifting-up state for putting or removing a CD. This CD cover arranges: a driving element that connects to the CD driving apparatus and makes it rotate, a controller that adjusts rotation speed of the driving element, and a switch that can touches off the controller to proceed a controlled motion with predetermined rotation speed. By touching off the switch, the controller can detect the rotation speed of the driving element. By comparing the detected rotation speed with a predetermined speed in the controller, when rotation speed is higher than the predetermined speed, the controller generates a signal to the driving element to reduce the rotation speed of motor. And when rotation speed is lower than the predetermined speed, a signal is generated to actuate a cover-lifting motion to the CD cover that is then in an open state.

11 Claims, 8 Drawing Sheets

OPTICAL STORAGE CARRIER PLAYER COVER-LOCKING MECHANISM AND METHOD FOR CONTROLLING THE COVER-LOCKING MECHANISM

FIELD OF THE INVENTION

The present invention relates to a compact disk (CD) player cover-locking mechanism and method, especially to one that has a single motion of a single pushing key to make a high speed rotating CD in a stopping state and a cover that actuates the open state.

BACKGROUND OF THE INVENTION

As time passed, technology progresses fast. Functions and speed of electronic products are improved quickly. Safety should be improved indispensably, because people use and contact these products frequently. The system speed of a CD player is improved. The rotation speed of the main motor that drives disk has already reached 10000 rpm, and it is possible to further exceed this speed. So when the cover of a CD player is lifted, if the disk can not stop rotating immediately, then it might hurt the user. This kind dangerous event can not be ignored.

Please refer to FIG. 1, which is a bead-blocking-typed CD driving apparatus of prior art. Wherein the CD player arranges a main motor 13, which can provide a rotation motion to a supporting plate 14 that can support the CD 11 and make a rotation motion, and with at least a shrinkable block bead 12 to fix the CD 11. When the main motor 13 is rotating, the CD 11 is block-fixed by the shrinkable block bead 12 to avoid flying outward caused by the centrifugal force of rotation. When the main motor 13 is slowing down or stopped, the centrifugal force applying on CD 11 is reduced, so the CD 11 is further surely fixed at the supporting plate 14 by the block-fixation of the shrinkable block bead 12 to avoid hurt on users or damage on surrounding objects. Because the block bead 12 is rigid, when CD 11 is being put in or taken out, the resistance of the shrinkable block bead is extremely large, so it depends a greater applying force to complete the procedure and easily causes deformation and damage on CD 11. Furthermore, if a CD is used frequently, the internal edge would be damaged due to the frequently contact between the interior hole and the shrinkable block bead 12.

Nowadays, the formerly improved multi-session CD player cover-locking mechanism is applied on the main axis motor with high rotation speed. First, trigger a stopping switch to make the main axis motor reduce speed, and then trigger another cover-lifting switch to lift up the cover of CD player. Then CD is under a state of speed reduction and the cover-lifting switch is actuated. It can avoid a rotating CD in a high speed to hurt users. Please refer to FIG. 2, which is a flow-path illustration for a formerly improved multi-session CD player cover-locking method. When CD is in a high rotation speed. Main axis motor to make a rotation motion, the CD player is under a state 101. When it is intended to take out the CD, the stopping switch is pushed down first. The main axis motor will reduce its down the open switch 104 again to open cover and take the CD out. Now, the CD is taken out under the state when the CD is reducing rotation speed or stopped. But since this cover-lifting actuation motion is a mechanical type, so the operator does not know when to trigger the cover-lifting actuation switch 104 and wastes time to wait. And it is also possible that the operator mistakenly touches the actuation switch 104 and actuates the cover 105, at this time, the CD is under a state of high rotation speed, and it may jeopardize the surrounding people, thing and object, etc.

SUMMARY OF THE INVENTION

The main object of the present invention is to provide a CD player cover-locking mechanism and method. By a single-session motion, then it can slow down the speed of a rotating CD, make it stop rotating and ensure the lifting-up of the CD cover is under a safe state to reduce the time for lifting up and increase the user's safety.

To achieve above purpose, the CD player arranges a cover, capable of entering the open state for putting or getting a CD and a locked up state for preventing the CD from jumping off. The CD player cover-locking mechanism of present invention includes: a switch, a locking means, a driving unit and a controller.

The switch is for receiving an actuating signal from a user.

The locking means is selectively engaged with the cover to make the cover to be in the locked up state; or separated from the cover to make cover be in the open state.

The driving unit arranges at least one supporting plate, which may support and rotate the CD disk within the carrier player, and the driving unit can drive the supporting plate to rotate.

The controller is coupled to the switch and the driving unit for detecting the rotational speed of the driving unit, the controller comprising: a rotation speed detection module for detecting the rotation speed of the driving unit, a comparative module coupled to the detection module for comparing the rotational speed with a pre-determined speed, and an signal generation module that is coupled to the comparative unit.

When the switch is actuated and the rotation speed is higher than the predetermined speed, the signal generation module generates a first signal transmitting to driving unit to reduce the rotation speed.

When the switch is actuated and the rotation speed is lower than the predetermined speed, the signal generation module generates a second signal transmitting to cover-engaging unit to make the locking means separated from the cover, such that the cover enters the open state.

In addition, to achieve above object, the present invention provides a CD player cover-locking method, which includes following steps:

(a) A CD player cover can actuates a locked state to prevent the cover being opened when CD is still rotating. In a CD player that further comprises a driving unit that is engaged with the CD to drive it rotating; a controller that can adjust the rotation speed of the driving unit; and a switch that can actuate the controller to proceed predetermined controlling motion of rotation speed.

(b) Trigger the switch.

(c) The controller detects the rotation speed of the driving unit.

(d) Compare the detected rotation speed with a predetermined speed in the controller.

(e) As the compared result is higher than the predetermined speed, the controller generates a signal transmitting into the driving unit to reduce its rotation speed, afterwards repeat step (c) through step (d); as the compared result is lower than the predetermined speed, the controller generates an output signal to drive the cover to actuate the open state.

For your esteemed review committee members to further understand and recognize the present invention, a detailed description in accordance with several drawings are presented as following:

BRIEF DESCRIPTION OF THE DRAWINGS

The invention, as well as its many advantages, may be further understood by the following detailed description and drawings in-which.

DETAILED DESCRIPTION OF THE PREFERRED EMBODIMENT

Figure 1:
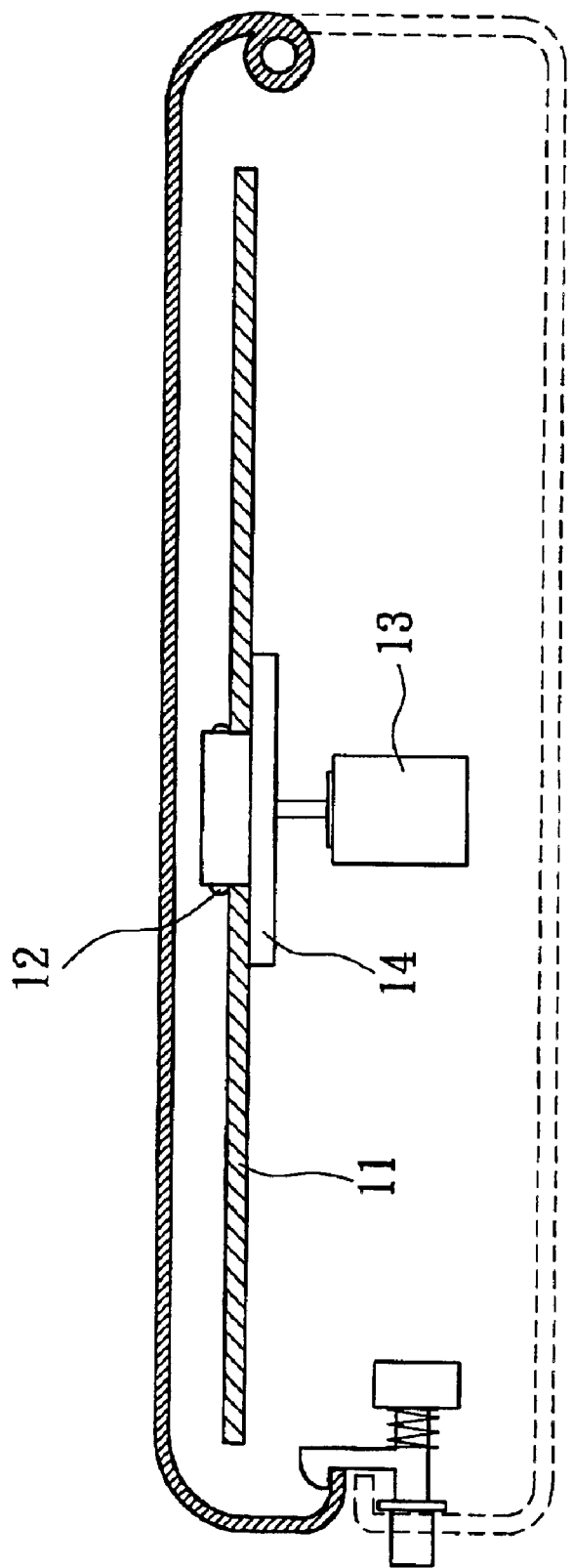
FIG. 1 is a prior shrinkable block-bead-typed CD player apparatus drawing.
Figure 2:
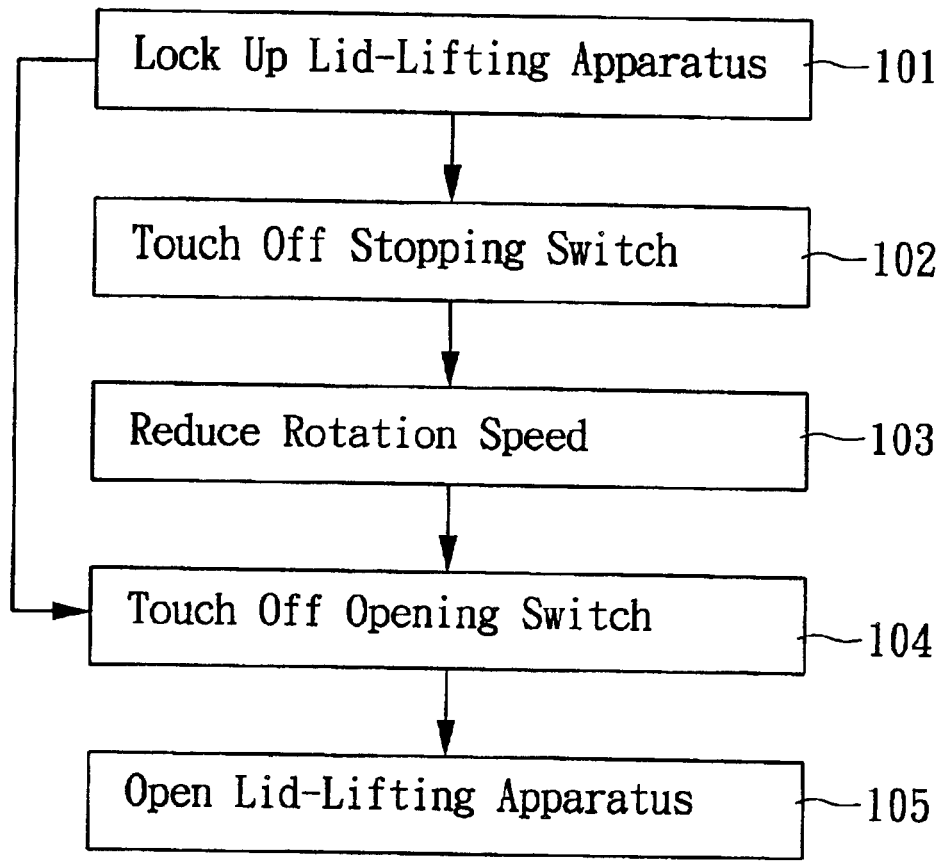
FIG. 2 is a flow-path illustration for formerly improved multi-session CD player cover-locking method.
Figure 3A:
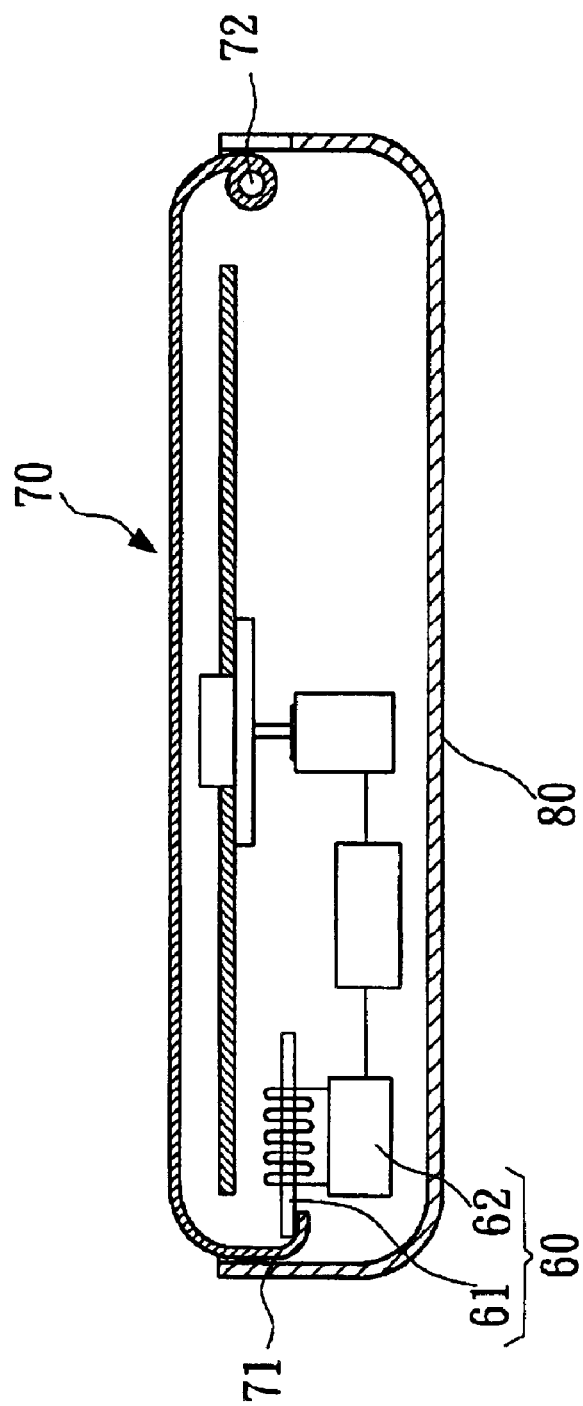
FIG. 3(A) is a locked state illustration for the first preferred embodiment of the CD player cover of the present invention.
Figure 3B:
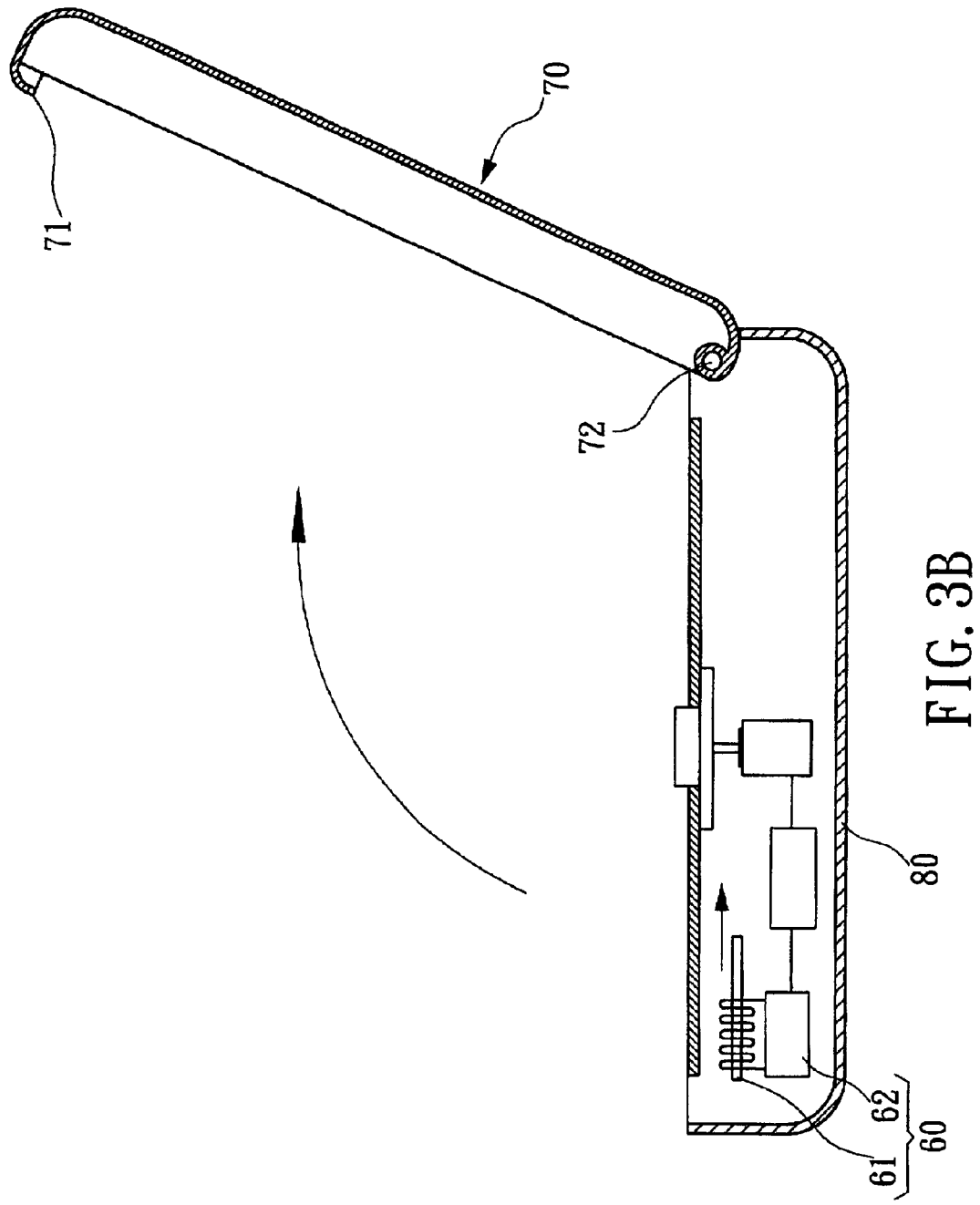
FIG. 3(B) is an open state illustration for the first preferred embodiment of the CD player cover of the present invention.

Please refer to FIG. 3(A) and FIG. 3(B), which show the first preferred embodiment illustrations of a CD player cover of the present invention. The CD player comprises a cover 70, which has a pivotally connection end 72 that is connected to a base 80 of the CD player. The cover 70 may be maintained in a locked state to prevent CD from jumping out of the player chamber during rotation (as shown in FIG. 3A). To allow to place and remove a CD (shown in FIG. 3B), an open state can be achieved by connecting only one end of the cover 70 onto the base 80 (at the pivotal end 72), while separating the other end of the cover 70 from the base 80, so that the cover 70 is pivotally separated from the base 80.

The cover 70 further comprises at least one blocking hooker 71, being selectively engaged with a cover-engaging unit 60. In this first preferred embodiment, the cover-engaging unit 60 comprises a solenoid valve 62 and a protruding block 61. When the solenoid valve 62 is in power off, the protruding block 61 is in an extending outward state and formed a locked state by engaging with the blocking hooker 71 to prevent the cover 70 from being opened up when the CD is still rotating in high speed (as shown in FIG. 3A). When the solenoid valve is power on, the protruding block 61 separates immediately from the blocking hooker 71 and allow the cover 70 to enter the open state for putting or removing a CD. In the mean time, the cover 70 taking pivotally connection end 72 as rotation axis can be directly lifted up by the operator, or by arranging a mechanical spring device (not shown in the figure) at the pivotally connection end 72 to make the cover 70 rotate and open up automatically (as shown in FIG. 3B).

Figure 4A:
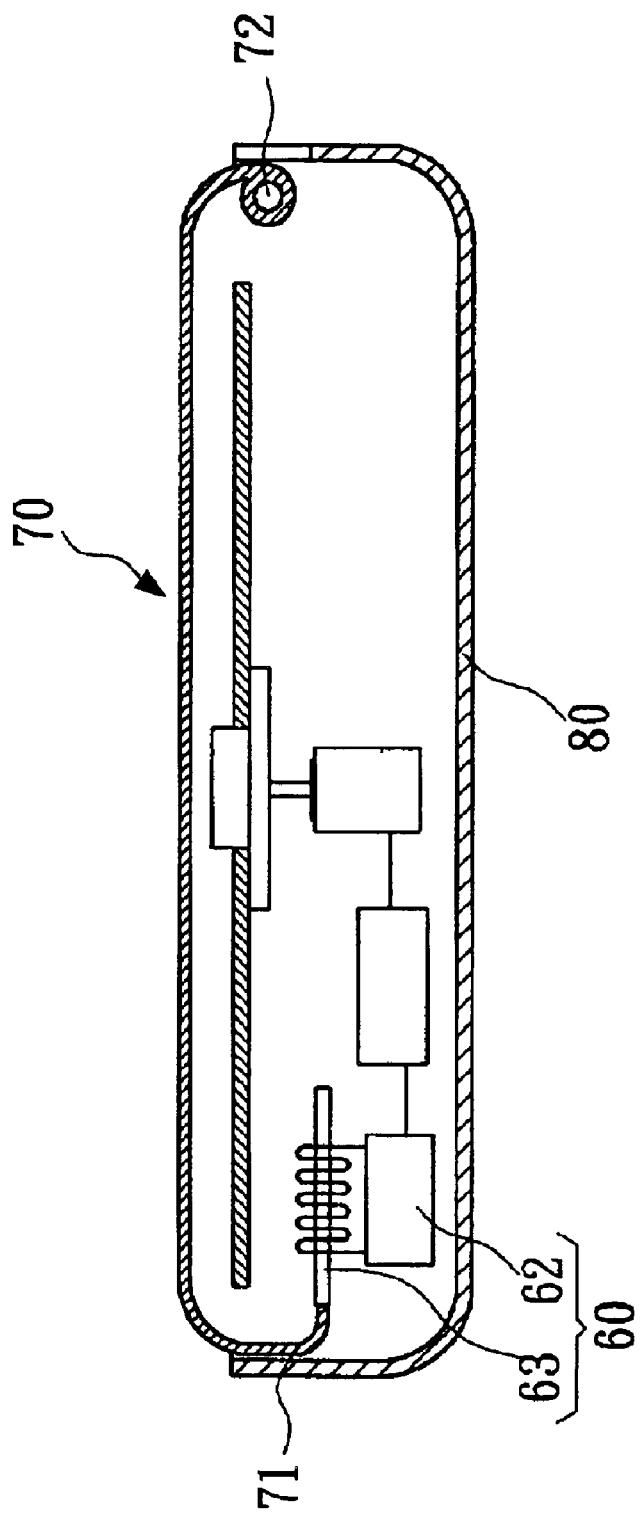
FIG. 4(A) is a locked state illustration for the second preferred embodiment of the CD player cover of the present invention.
Figure 4B:
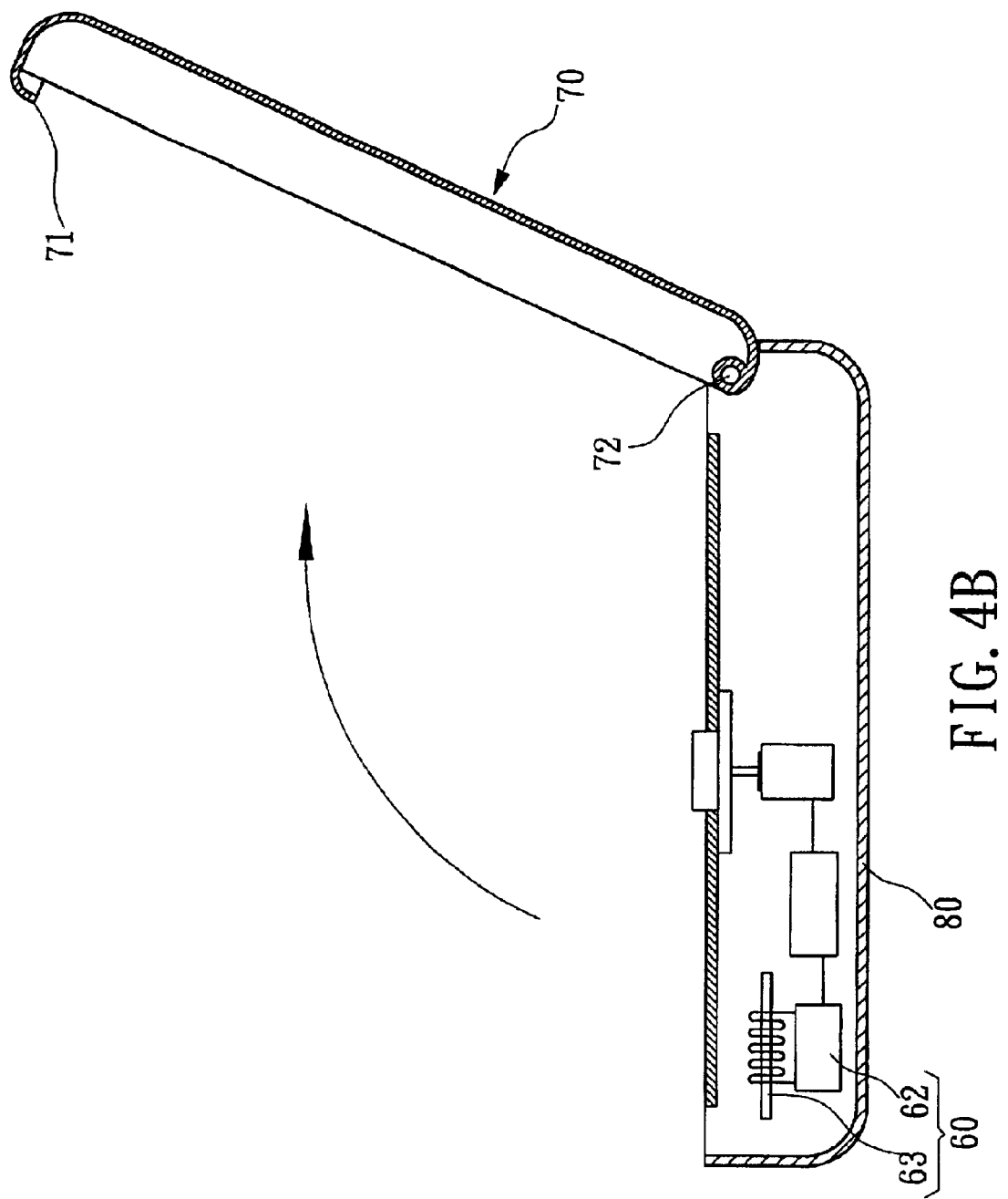
FIG. 4(B) is an open state illustration for the second preferred embodiment of the CD player cover of the present invention.

Please refer to FIG. 4(A) and FIG. 4(B), which show the second preferred embodiment illustrations of a CD player cover of the present invention. Wherein the cover 70 is a device may achieve the functions of opening up or closing up in an alternative way. The block hooker 71 is a metal plate can be attracted by magnetic force, and the cover-engaging unit 60 is a device that combines a solenoid valve 62 and electromagnetic steel 63. The electromagnetic steel 63 generates a magnetic force by powering on the solenoid valve 62 to attract the block hooker 71 and make the cover 70 maintained in the locked state. The electromagnetic steel 63 is off magnetism when the solenoid valve 62 is powered off. Without further magnetic force applied onto the block hooker 71, the cover 70 will take the pivotally connection end 72 as a rotation axis and then is allowed to enter the open state. Such kind device variation application is well known to the people who are familiar with such kind technique and also within the scope of structure patent of present invention, so detailed description is not repetitious here.

Figure 5:
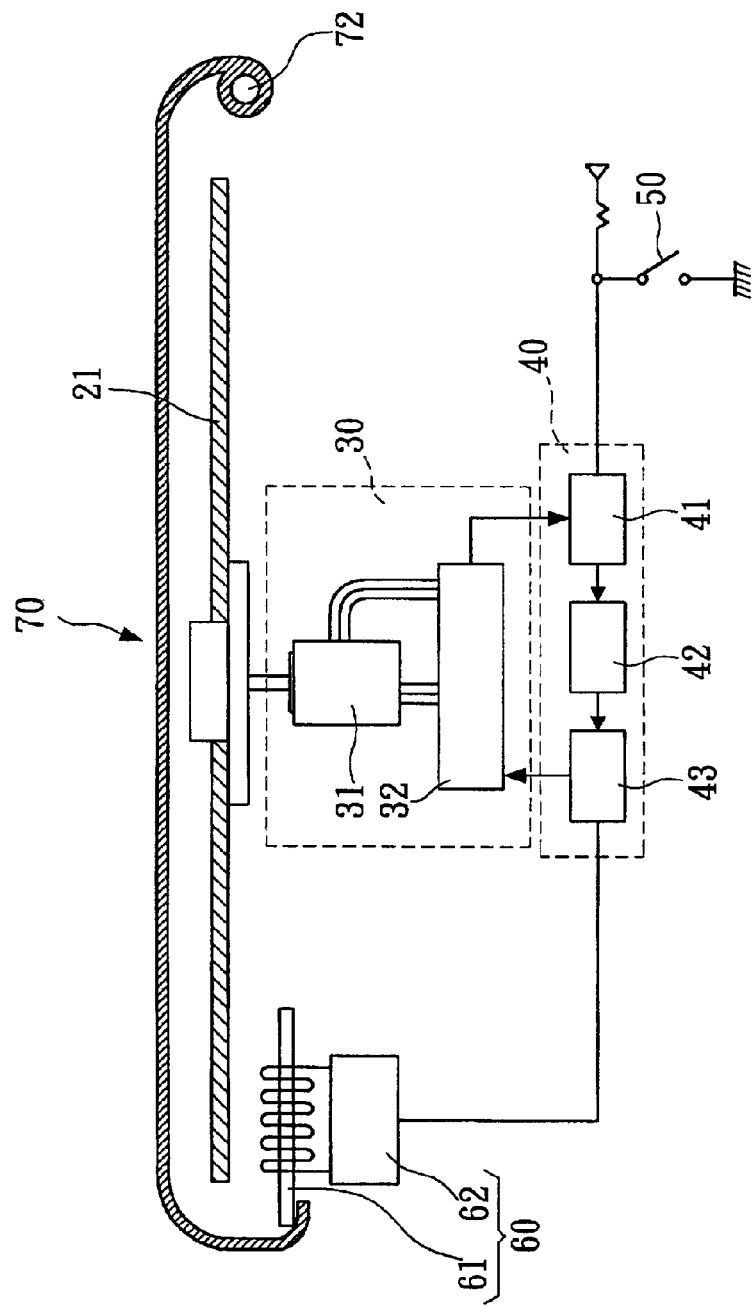
FIG. 5 is a preferred embodiment illustration for a CD player cover-locking mechanism of the present invention.

Please refer to FIG. 5, which is a more detailed functional block of preferred embodiment illustration for a CD player cover-locking mechanism of the present invention. The CD player cover-locking mechanism includes: a switch 50, a cover 70, a cover-engaging unit 60, a driving unit 30 and a controller 40.

The switch 50 can be operated by manual or remote control.

The cover 70 takes a pivotally connection end 72 as rotation axis and selectively maintained in the open state for putting or removing a CD 11 and in a locked state for preventing a CD 11 from jumping off in rotation motion.

In this preferred embodiment, the cover-engaging unit 60 comprises a solenoid valve 62 can be powered on or off to selectively engage with or separated from a protruding block 61. When the protruding block 61 is separated from the cover 70, then the cover 70 is allowed to enter the open state. Of course, it also could be a device variation or application of the preferred embodiment of the CD player cover described on above FIG. 4(A) and FIG. 4(B), so a further detailed description is not presented here.

The driving unit 30 supports and rotates the CD 11. The driving unit 30 comprises at least one motor 31 that connects with a supporting plate 14. A CD 11 can be placed on the supporting plate 14. The CD 11 will rotate together with the supporting plate 14, and the motor driver circuit 32 actuates the motor 31 to make rotation motion.

The controller 40 is a microprocessor that can implement a signal processing or signal comparison and connects with the driving unit 30 to adjust its rotation speed. Wherein the controller 40 includes at least: a detection module 41 that can retrieve the data of rotation speed, a comparison module 42 that connects with the detection module 41 as the switch 50 is being actuated may compare the rotation speed with a predetermined speed, and an signal generation module 43 that connects with the comparison module 42 as the comparison module 42 compares the rotation speed to be higher than the predetermined speed transmits a signal to the driving unit 30 to reduce its rotation speed and as the comparison module 42 compares out the rotation speed to be lower than the predetermined speed then generates a signal output to the cover-engaging unit 60 to drive the cover 70 to be actuated to the open state.

Figure 6:
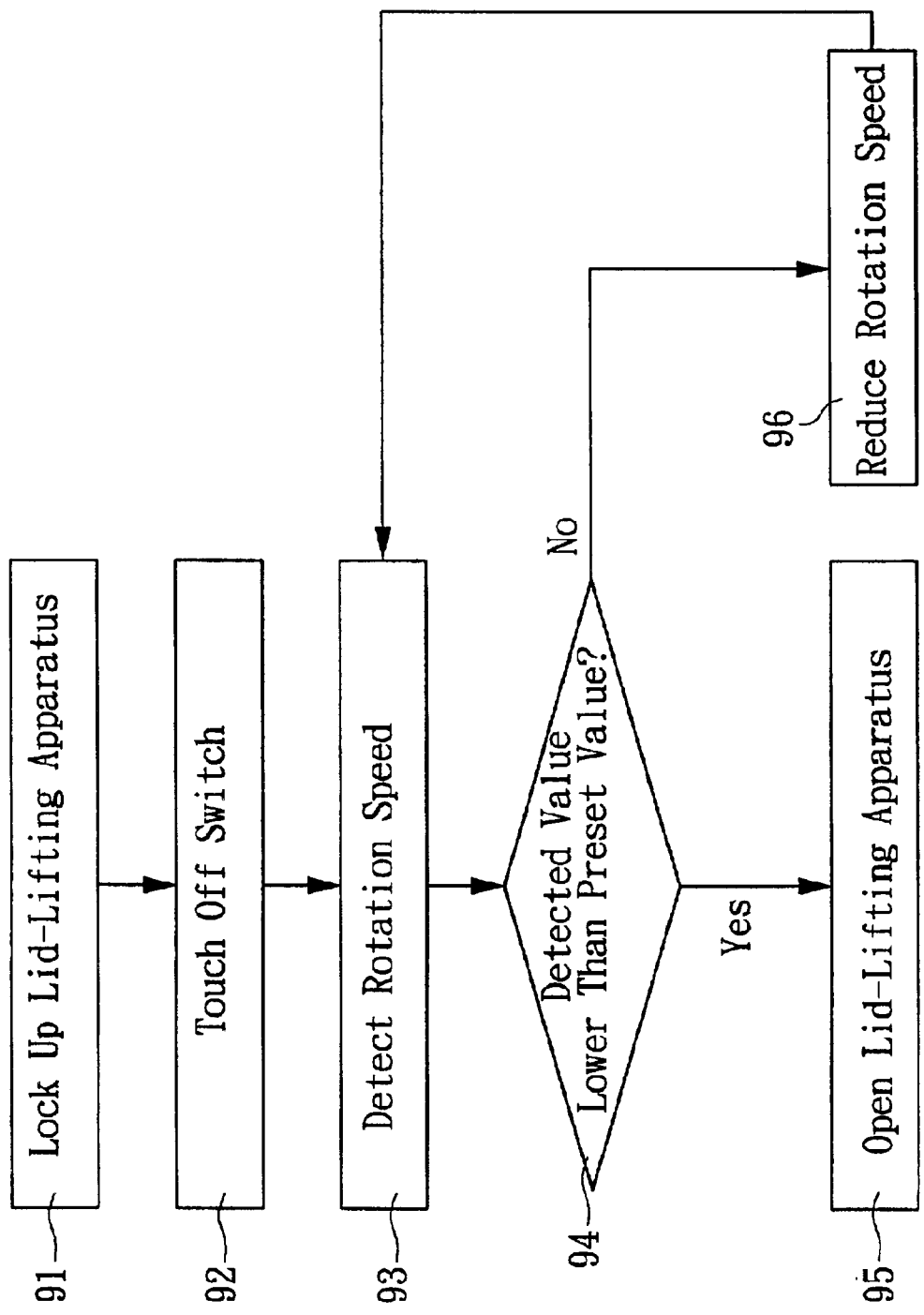
FIG. 6 is a flow-path illustration for a CD player cover-lifting opening method of the present invention.

Please refer to FIG. 6, which is a flow-path illustration for the opening method of CD player cover-locking of present invention. The CD player comprises a driving unit 30 supports and rotates a CD. The CD player cover now is maintained in the locked state 91 to prevent cover from opening as CD is rotating. The switch 92 is actuated by manual operation or remote control. When the switch is not actuated, the driving unit 30 rotates the CD in high speed. When the switch is actuated, the controller detects the rotation speed signal 93 of the driving unit 30. The rotation speed signal can be a directly retrievable three-phase signal of motor or a reading signal of specific area of detected CD. Since all the motions are in circular, so the rotation speed signal is a sine wave signal.

At this time, the driving unit 30 transforms the retrieved rotation speed signal from a sine wave signal into a pulse signal with intervals. The pulse may correspond to either the wave crest or the wave valley of the sine wave. The predetermined speed has been defined through a series test that the interval between pulses is long enough to represent the low speed rotation of the CD, such that the user can access the CD safely, and the cover 70 is allowed to enter the open state. Comparing the detected rotation speed with a predetermined speed 94, the controller 40 determines whether the detected rotation speed is lower than the predetermined speed 94 or not.

Compare the resulted rotation speed whether it is lower than a predetermined speed 94 or not. When the rotation speed is lower than the predetermined speed, i.e. as the pulse interval of CD rotation speed is larger than that of the predetermined speed, the controller generates a open signal to actuate the cover to enter the open state 95.

When the compared result is that the rotation speed is higher than the predetermined speed, i.e. when the pulse interval of a CD rotation speed is lower than the predetermined speed. The controller will generate a speed-reduction signal to the driving unit to reduce its rotation speed 96. The controller 40 simultaneously keeps detecting the rotation speed. If the rotation speed is still higher than the predetermined speed, then the controller 40 will repeat above speed-reduction procedure. When the rotation speed is lower than the predetermined speed, it will drive the cover to enter the open state 95.

From above apparatus and method, it is sure that they can effectively solve the problem of longer-waiting time needed for prior CD drive and will be a safe cover-locking mechanism They are really an invention can enhance the performance of production industries.

Above mentions are the preferred embodiments applied to describe the present invention in detail, but not the restricted scope of the present invention. And all the persons familiar such techniques should understand that an appropriate, small change and adjustment for them still possesses the merits of the present invention and also within the spirits and ranges of the present invention.

In summary, the implementing concretion of the present invention is truly fulfilled the invention patent prerequisite regulated in the patent law. Sincerely please your esteemed review committee members examine present patent application in favorable way and grant it as a patent wishfully.

What is claimed is:

1. A method for controlling an open state and a locked state of a cover installed on an optical storage carrier player, the carrier player having a driving unit for supporting and rotating an optical storage carrier, a locking means for selectively engaged with or separated from the cover, and a controller coupled to the driving unit and the locking means, the method comprising following steps of:
   (a) presenting an actuating signal to actuate the controller to detect a rotation speed of the driving unit and compare the rotation speed with a predetermined speed wherein the rotation speed of the driving unit is detected by transforming a sine wave signal generated by the driving unit into a series of pulse signal with intervals,
   (b) generating a first control signal by the controller transmitting to the locking means to make the locking means engaged with the cover when the detected rotation speed is higher than the predetermined speed; and
   (c) generating a second control signal by the controller transmitting to the locking means to make the locking means separated from the cover when the detected rotation speed is lower than the predetermined speed to make the cover to enter the open state.

2. The method of claim 1, wherein the controller generates a speed-reduction signal transmitting to the driving unit to reduce the rotation speed when the detected rotation speed is higher than the predetermined speed and the actuating signal is presented.

3. The method of claim 2, wherein the speed-reduction signal is a series of pulse signal with a longer interval corresponding to a reduced rotation speed lower than the predetermined speed.

4. The method of claim 1, wherein the actuating signal of step (a) is remotely presented through a switch.

5. The method of claim 1, wherein the pulse is corresponding to the wave crest of the sine wave.

6. The method of claim 1, wherein the pulse is corresponding to the wave valley of the sine wave.

7. A cover-locking mechanism for an optical storage carrier player, the cover-locking mechanism comprising:
   a switch receiving an actuating signal from a user;
   a cover disposed on the carrier player and selectively actuated to enter an open state for placing or removing a carrier;
   a driving unit disposed on the carrier player transforming a rotation speed signal from a sine wave signal into a pulse signal with a plurality of intervals; and
   a controller coupled to the switch and the driving unit, and receiving the pulse signal, wherein the controller generates an open signal to actuate the cover to enter the open state when Intervals of the pulse signal are larger than a predetermined interval.

8. The cover-locking mechanism of claim 7, wherein the controller comprises:
   a rotation speed detection module receiving the pulse signal and detecting the rotation speed of the driving unit;
   a comparative module coupled to the rotation speed detection module and comparing the intervals of the pulse signal with a pre-determined interval; and
   a signal generation module generating a speed-reduction signal transmitted to the driving unit reducing its rotation speed when the intervals of the pulse signal are larger than a predetermined interval and generating an output signal to make the cover enter the open state.

9. The cover-locking mechanism of claim 7, further comprising:
   a locking device disposed on the carrier player selectively engaged with or separated from the cover; and,
   a cover-engaging unit selectively driving the locking means to release the cover to the open state.

10. The cover-locking mechanism of claim 9, wherein the cover-engaging unit comprises a solenoid valve and the locking device is a slidable protruding block, the protruding block is engaged with the cover when the solenoid valve is power-off, and the protruding block is separated from the cover when the solenoid valve is power-on.

11. The cover-locking mechanism of claim 7, wherein the locking device is an electromagnet, the electromagnet is engaged with the cover when the electromagnet is power-on, and the electromagnet is separated from the cover when the electromagnet is power-off.

* * * * *